United States Patent [19]

Orsinger et al.

[11] 4,201,617

[45] May 6, 1980

[54] UV LABEL SPRAYER FOR SEGREGATING MAIL

[75] Inventors: Winston A. Orsinger, Nazareth; Warren D. Reinert, Easton, both of Pa.

[73] Assignee: Bell & Howell Company, Phillipsburg, N.J.

[21] Appl. No.: 26,709

[22] Filed: Apr. 3, 1979

[51] Int. Cl.[2] .............................................. B32B 31/00

[52] U.S. Cl. .................................... 156/351; 118/712; 156/356; 156/378

[58] Field of Search ........................ 156/351, 353-355, 156/361, 566, 510, 384, 378, 356-357; 101/DIG. 3; 118/672, 684, 712, 713; 209/584

[56] References Cited

U.S. PATENT DOCUMENTS

| | | | |
|---|---|---|---|
| 2,975,703 | 3/1961 | Burkhardt | 101/114 |
| 3,458,383 | 7/1969 | Kirk et al. | 156/566 |
| 3,520,404 | 7/1970 | Pine | 209/584 X |
| 3,557,949 | 1/1971 | Washington | 156/566 X |
| 3,584,571 | 6/1971 | Schmoll | 101/114 X |
| 3,599,229 | 8/1971 | Merrell | 101/366 X |
| 3,652,828 | 3/1972 | Sathem | 209/584 X |
| 3,713,948 | 1/1973 | Kluger | 156/355 X |
| 3,839,636 | 10/1974 | Worrall | 209/584 X |
| 3,865,073 | 2/1975 | Jahn | 118/8 |
| 3,875,893 | 4/1975 | Riley et al. | 118/7 |
| 3,891,492 | 6/1975 | Watson | 156/351 |
| 3,915,785 | 10/1975 | Muller | 156/355 X |

*Primary Examiner*—David A. Simmons
*Attorney, Agent, or Firm*—Griffin, Branigan & Butler

[57] ABSTRACT

Sheets of address labels are scanned to determine when zip code changes occur. When such changes are detected an ultraviolet dye is sprayed by an air brush through a mask onto the first and all successive labels having the changed zip code. When the next zip code change is detected the spraying is terminated until a still further change occurs. The labels are then cut and affixed to envelopes for further detection and sorting into various zip codes for mailing.

12 Claims, 4 Drawing Figures

UV LABEL SPRAYER FOR SEGREGATING MAIL

BACKGROUND OF THE INVENTION

This invention is related to mail handling as performed by commercial bulk mailing houses and in particular to the presorting of bulk-rate mail to comply with postal regulations and presorting of first class mail to achieve a reduction of first class postage costs.

Postal regulations currently require that commercial mail houses segregate their bulk-rate mail by zip codes and tag the segregated bundles with destination tags. In addition, first class mail may be mailed at a lower rate if it is also presorted, segregated and tagged with destination tags.

Address labels are often printed by computers on computer forms in a 3, 4, or 5 abreast configuration in continuous columns from beginning to end in zip code order. At each break in the zip code, where there is a change, the computer can print an asterisk or some other easily recognizable symbol which can be detected by current state of the art photodetectors.

One current mechanical/electronic means of detecting zip code changes has complex electronic equipment with counting devices to account for the time delay. That is, the delay from the time a computer symbol indicating a change in a zip code is noted until a mechanical marking or spraying device applies a mark or spray to a label affixed to the face of an envelope. In this manner identification is made possible after the contents have been inserted in the envelopes. Additionally, the type of marking or spraying must be done accurately to keep from obliterating the address on the label and to accommodate subsequent detection and mail segregating devices.

Another current device identifies the computer symbol indicating a zip code change on the address label as the mailing piece to which it is affixed passes rapidly by on a conveyor. It then sprays the moving label with an ultra violet dye from a single high speed sprayer. It is difficult, however, for this device to detect the computer symbol indicating a zip code change every time because machines that affix labels to mailing pieces can't register the labels much closer than one eighth of an inch to a desired position. Moreover, such devices have a tendency to "overspray" to the point where even the conveyor track is sprayed so that the backs of subsequent envelopes pick up spray and cause undesired sorting errors.

Also, it is difficult to provide a sharp leading edge when spraying a moving label. Consequently, the photocells that detect and control later segregation have difficulty reading these ultraviolet markings.

It is an object of this invention to provide a label spraying mechanism for permitting improved separation of mail into zip-code categories.

It is a further object of this invention to provide a marking on the address label at zip code changes which is readily detectable by current state of the art detection means for segregating the address envelopes after their contents have been inserted.

An attendant advantage of a preferred embodiment of the invention is that address labels are sprayed with a dye while they are still in computer-form configuration and before they are separated so that there is minimal delay between detection and marking. An additional advantage is that the address labels are marked with a dye in a manner that does not tend to obliterate the address on the label and confuse postal employees. Still further, the illustrated embodiment sprays many labels at one time. Hence, they are not moving as fast as if they were on a single envelope and, therefore, can be more accurately sprayed.

An additional advantage of zip-spraying before labels are attached is that the spray can be more accurately located on the label. That is, it is difficult to accurately locate a label on an envelope so that once a label is affixed to an envelope it loses its accuracy of registration with regard to the label spraying mechanism.

A still further advantage is that, before they are affixed to an envelope, the labels can be "oversprayed" to make an extra heavy coating of ultra violet dye and the "drippage" can be collected and reused if desired. Once, the label is on an envelope, however, overspraying is not practical.

SUMMARY

Sheets of address labels are scanned to determine when zip code changes occur. When such changes are detected an ultraviolet dye is sprayed by a sprayer through a mask onto the first and all successive labels having the changed zip code. When the next zip code change is detected the spraying is terminated until a still further change occurs. The labels are then cut and affixed to envelopes for further detection and sorting into various zip codes for mailing.

DESCRIPTION OF PREFERRED EMBODIMENT

A dye spray system selectively sprays or applys a radiation-emissive coating such as an ultraviolet (UV) dye to address lables which bear the same zip code or the zip code of the same Post Office Sectional Center. The ultraviolet dye is sprayed selectively on address labels to facilitate the later sorting of the letters to which the labels have been attached. For example, the ultraviolet dye is applied to all consecutive labels bearing the same zip code or the zip code of the same Sectional Center. Upon detection of a change to another zip code or another postal Sectional Center zip code the spraying will be terminated until such time as the next group of labels bearing a new zip code or a different postal Sectional Center zip code is detected entering the system. In this respect, methods of computer marking and detecting the change in zip codes on address labels are well known within the current art and will not be discussed in detail.

Figure 1:
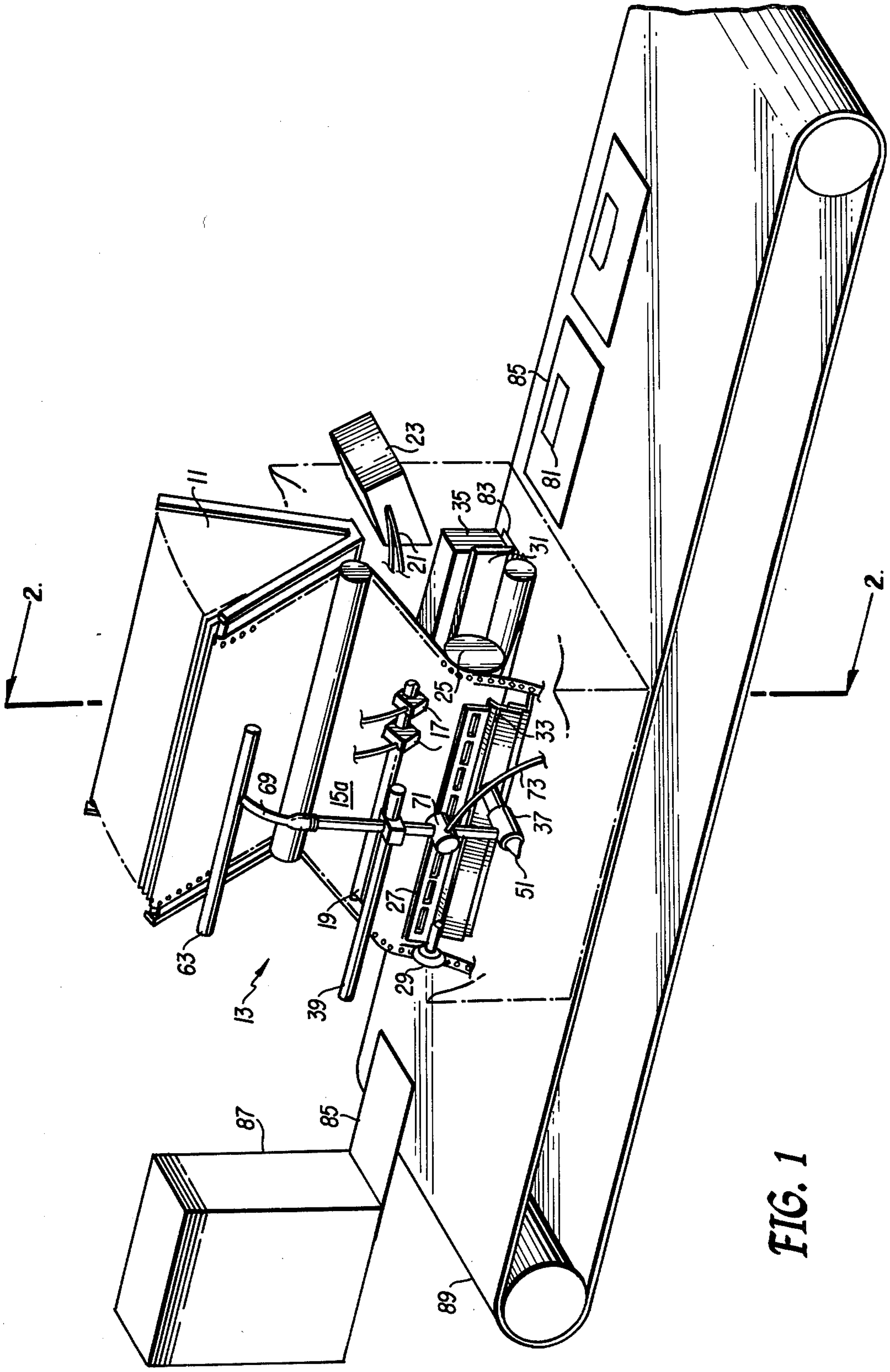
FIG. 1 is a perspective, schematic view of a UV label sprayer.
Figure 3:
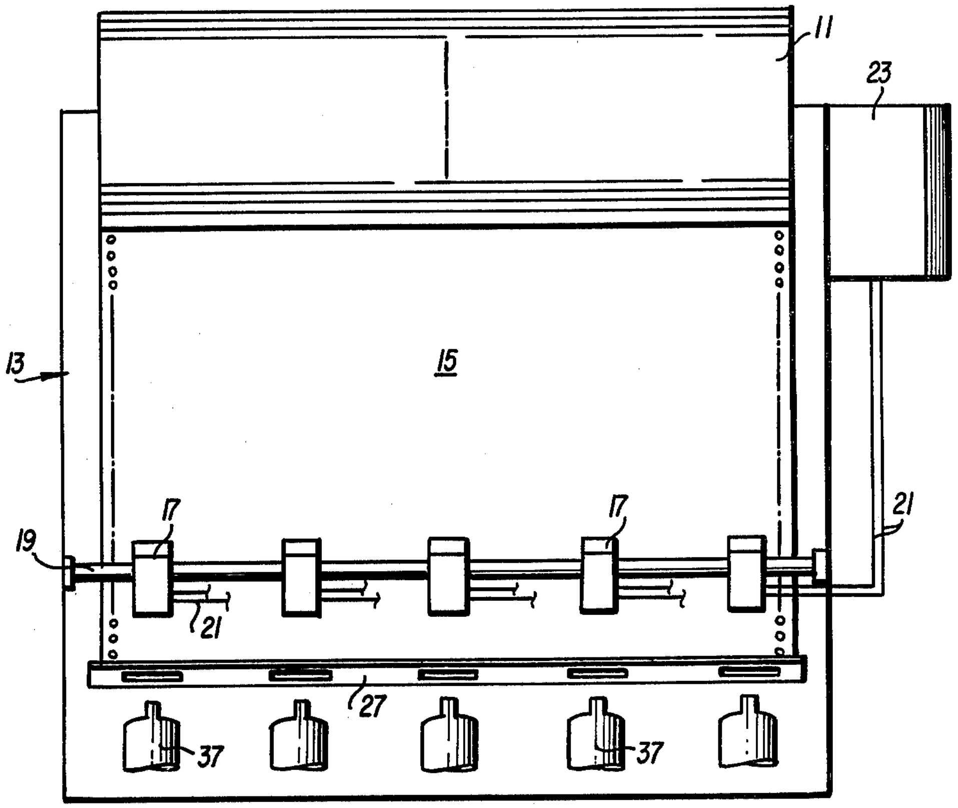
FIG. 3 is a schematic top view of a portion of FIG. 2 taken along lines 3—3; and, FIG. 4 is a schematic front view taken along lines 4—4 of FIG. 2.

In FIG. 1, a stack 11 of computer-printed, address-label forms 15 is located on the rear of a labelling machine 13. Continuous-form sheets 15, for example, of five-up computer-printed address-label forms are fed one at a time through the labelling machine passing first under a row of five photodetectors 17 which are mounted on a bar 19 and connected by an electric circuit 21 to a control panel 23 (FIG. 3).

Figure 2:
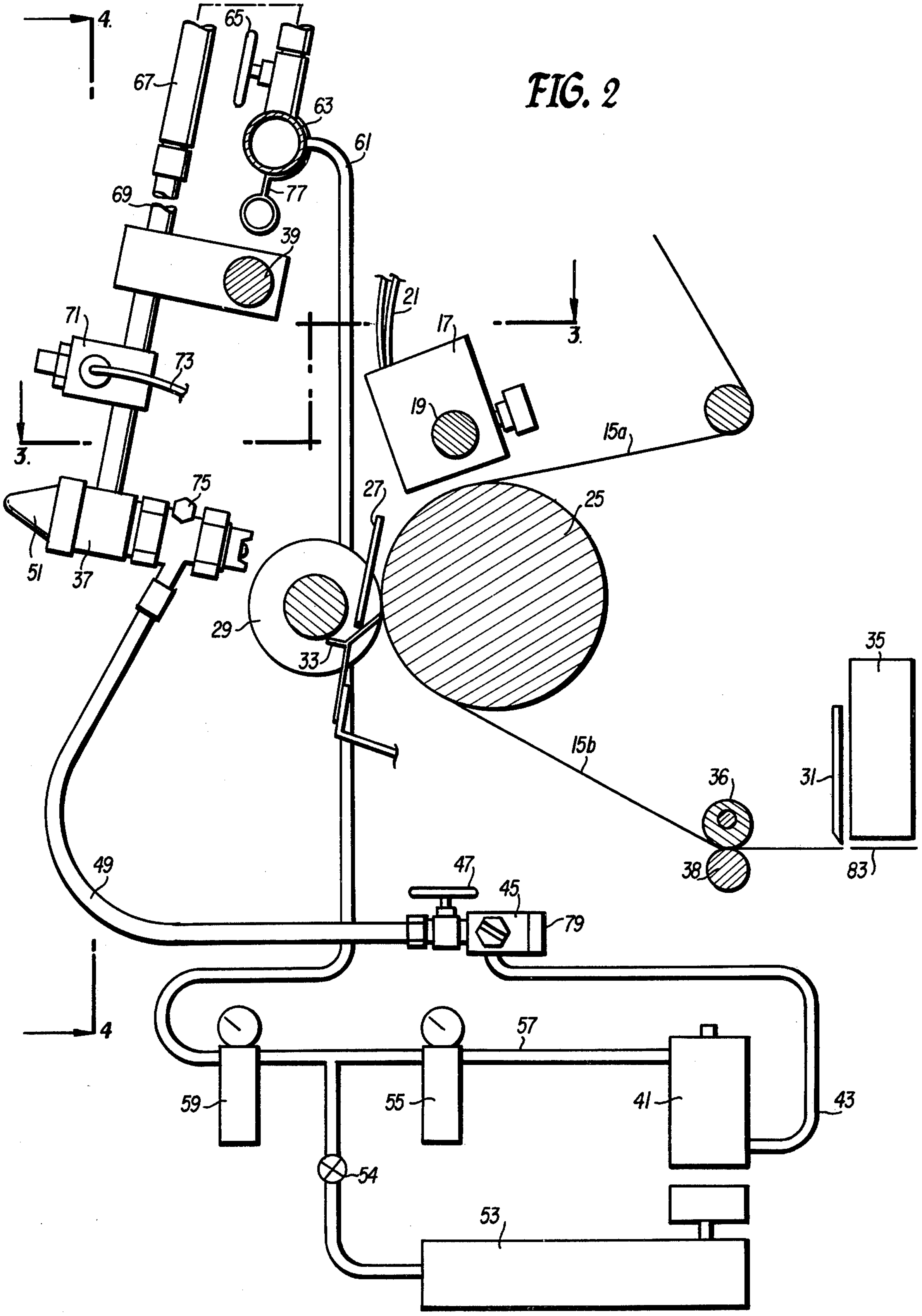
FIG. 2 is a schematic side view of the UV label sprayer system taken along the lines 2—2 of FIG. 1.

In FIG. 2, the computer address label forms 15 are looped over continuously running, pin-feed-type drive wheel 25 and pass under a label mask 27, through a pair of rotary slitter knives 29 for trimming pin perforations and back to a guillotine cutter 31. A UV dye collector trough 33 is positioned below the label mask 27. In this respect, the mask can have fixed apertures and be made of a clear material or, if desired, can have adjustable apertures so that the size of the opening and location of the leading edges can be adjusted. A conventional label cutting and affixing apparatus 35 is positioned to the rear of the guillotine cutter 31. In this respect, the continuously running pin wheels 25 tend to put slack in portion 15*b* of the label forms, but an eccentric wheel 36 operates against an idler 38 to intermittently drive one row of labels at a time under the guillotine 31.

Figure 4:
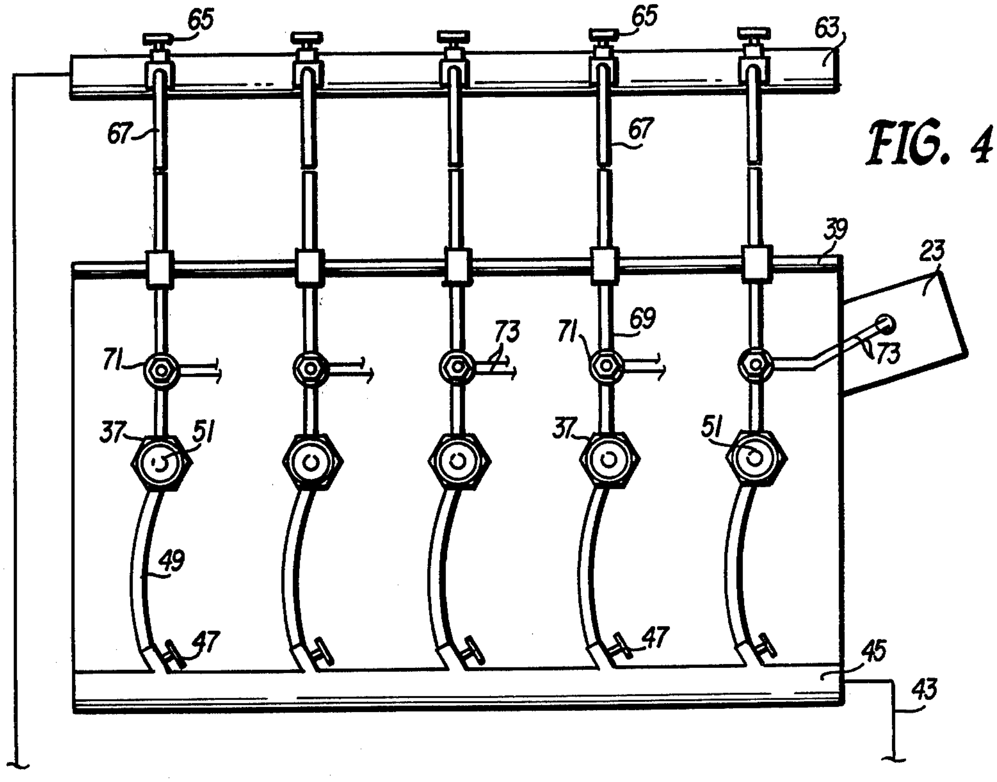

In FIG. 4, five spray mechanisms 37 are mounted on a bar 39 in front of the label mask 27 and, as illustrated in FIG. 2, are connected to a low pressure ultraviolet dye supply tank 41 by a first fluid line 43 which feeds to a fluid manifold 45, individual shut-off valves 47, and, individual flexible fluid lines 49. One suitable type of sprayer is sold under the tradename Passche Air Brush and is available in several models. A fluid control valve 51 is mounted on the rear of each sprayer 37. The low pressure UV dye supply tank 41 is connected to an air compressor and air supply tank 53 through a valve 54 to a low pressure regulator 55 and a low pressure air line 57.

The five sprayers 37 are connected to an air compressor and air supply tank 53 through the valve 54, to a high pressure air regulator 59, a first high pressure air line 61, an air manifold 63, individual air shut-off valves 65, individual flexible, high-pressure air lines 67, and a main air line 69 which is mounted to the top of each sprayer 37.

A solenoid valve 71, connected by an electric circuit 73 to control panel 23 (FIGS. 3 and 4) is mounted on each main air line 69 and an air control valve 75 is mounted on the top of each sprayer 37 (FIG. 2).

In FIG. 2, the air manifold 63 is mounted on a support rod and bracket 77 which is affixed to the labelling machine 13; and, the fluid manifold 45 is mounted to support bracket 79 which is also secured to the labelling machine 13.

As can be seen in FIG. 1, envelopes 85 are stacked in a stacking bin 87 at the head of a conveyor 89 which services the labelling machine 13.

In operation, the sheets of the continuous form computer-printed address-labels 15 are delivered from the stack 11 onto the top deck of the labelling machine 13. The labels are then moved under the five-abreast photo-detectors 17 each of which is in alignment with a single vertical column of address labels. Each photo-detector 17 is able to detect a change in an address-label zip code from the preceding address label and, where appropriate, transmits a change-detection signal to the control panel 23.

In response to the change-detection signal, the control panel 23 activates the solenoid valve 71 to open or close the main air line 69 to the selected sprayer 37 that is in line with the detecting photo detector 17. The control panel 23 further activates the solenoid valves 71 on the other sprayers 37 next in sequence following the address label with the zip code change. When the solenoid valves 71 are activated to open the main air lines 69, each sprayer 37 emits a spray of UV dye through the label mask 27 onto single address labels 81 as the single sheets 15 of address labels are moved past the label mask. The sprayers 37 are pulsed to spray each label for a given length of time such as 120 milliseconds in a preferred embodiment. Each vertical row of single labels is sprayed, however, until another change in zip code is detected by one of the photo-detectors 17. Then the control panel 23 activates the solenoid valves 71 that are not in sequence to close the main air lines 69 and the sprayers 37 cease spraying.

The preferred embodiment has been described in connection with five selectively operable sprayers. That is, all five are capable of spraying at any given time, but if a zip change signal is sent on the third of the five-abreast labels, for example, the third, fourth and fifth labels would be sprayed, but the first and second on that line would not. If the label sheets 15 comprised of other than five row of labels the structure is easily adapted to accommodate such a format. If more than five labels are used, for example, more sprayers are added; and, if there are less than five labels in each row, one or more of the sprayers are merely selectively de-activated by the control means 23.

The ultraviolet dye is continuously provided under low pressure to each sprayer 37 from the supply tank 41 but is not emitted as a spray until the corresponding high pressure main air line 69 is opened by the corresponding solenoid valve 71 upon activation by the control panel 23. Excess UV dye from overspraying can be collected in the trough 33 and returned, if desired, to the UV dye supply tank 41.

The density of the UV dye sprayed onto the address labels 81 can be controlled by manually adjusting the fluid control valve 51 mounted on each sprayer 37. This allows an operator to compensate for changes in the speed of the address labels 15 through the labelling machine 13 and to maintain a desired density of UV dye applied to each address label 81. In this respect, it is important that the labels not be too wet when they pass under the guillotine 31. This can be controlled by varying the amount of spray and/or the air pressure. Also the density of the UV dye itself can be controlled by varying the amount of UV material that is placed in the carrier fluid.

The air compressor and air supply tank 53 supply high pressure air to the low pressure regulator 55 which reduces the pressure to about 5 pounds per square inch and transmits the compressed air through the low pressure line 57 to the UV dye supply tank 41. The UV dye supply tank 41 delivers the ultraviolet dye under low pressure through a low pressure line 43 to the common fluid manifold 45. Each sprayer 37 is connected independently by a separate flexible supply line 49 and a fluid shut-off valve 47 to the fluid manifold 45.

The air compressor and air supply tank 53 supply high pressure air to the high pressure regulator 59 which transmits it through the high pressure line 61 to the common air manifold 63. Each sprayer 37 is independently connected to the common air manifold 63 through a main air line 69, a flexible high pressure air line 67, and, an air shut-off valve 65.

At the completion of the labelling operation when the labelling machine 13 is shut down, the fluid shut-off valve 47 and the air shut-off valve 65 are shut off to remove the pressure from the sprayers 37 and to provide for cleaning the dye from the nozzles of the sprayers 37.

As the address labels 15 pass the label mask 27 they encounter the pair of rotary slitter knives 29 which act against a hardened wheel to trim off drive perforations from both sides of the sheets 15. As noted above, the trimmed sheets of address labels are then indexed under the guillotine cutter 31 which cuts off each single horizontal row of address labels 83 from the advancing sheets 15. A conventional label-cutting and affixing apparatus 35 cuts each row of address labels 83 into separate labels 81 and affixes them one at a time to envelopes 85.

In the above regard, the unlabelled envelopes 85 are delivered from the envelope stacking bin 87 onto the conveyor 89 which passes under the labelling machine 13 where the individual address labels 81 are affixed to the envelopes 85. The labelled envelopes are then delivered down a production line to a mail inserter, a postage meter, and finally to a zip stagger sorter which then separates the envelopes with dye marked labels by offsetting them from the row of envelopes with unmarked address labels to facilitate segregated bundling and bagging by destination zip code.

The ultraviolet dye marking system described above has a number of advantages over prior systems. The placing of the photo-detectors 17 in a position over the uncut labels just prior to the sprayers 37 does away with the need for incorporating a complex counting mechanism which is prevalent in current art where there is a significant separation between the detecting mechanism and the spray device which sprays the labels after they are affixed to the individual envelopes.

Also, spraying through a mask onto the individual labels before they are cut apart provides a very heavy concentration of the ultraviolet dye on the label without spraying all over the entire surface of a moving envelope as it passes under the sprayer as is the case in the current art. The desired pattern can be sprayed accurately on each label and the density sprayed by each sprayer can be accurately controlled and varied as noted above to accommodate different rates of passage of the sheets of labels.

An address label cut from the UV dye coated sheet of labels provides a densely sprayed area with a sharp leading edge for easily-read detection at the zip stagger sorter station. Because of the sharp leading edge, smaller signals can be read in the lower frequency blue 400–535 millimicron range.

Any overspray from the sprayers can be readily collected from the label mask area and, if desired, salvaged for further use.

While various aspects of the invention have been described with reference to specific exemplary structure, many alterations, modifications and variations will be apparent to those skilled in the art in light of this disclosure. In connection with the zip codes, for example, it will be understood that a selected zip code change from a first arrangement to a second arrangement can be based on less than all of the zip code's digits. In many cases, for instance, it is only desired to sort mail in accordance with the code's first three digits. Hence, changes in the remaining digits are not considered to be changes in the selected arrangement. Similarly, it will be appreciated that, although the invention has been described in connection with envelope labels, it is also applicable to magazine labels and the like. Accordingly, it is intended to embrace all such alterations, modifications, and variations which fall within the spirit and scope of this invention as defined by the claims.

The embodiments of the invention in which an exclusive property or privilege is claimed are defined by the following:

1. A method of zip-sorting mail comprising the steps of:
   - providing sheets of address labels in rows and columns and placing indicia thereon to indicate when at least the first of a group of labels changes from a first to a second selected zip arrangement;
   - moving said labels relative to an indicia sensing means;
   - sensing said indicia and providing a zip change signal to indicate a zip arrangement change;
   - spraying at least said first of said group of labels with a sensible dye in response to said zip-change signal;
   - separating said labels and thereafter applying said labels to envelopes in the same order as said labels are moved relative to said indicia sensing means; and,
   - subsequently sensing said sensible dye to identify envelopes having labels indicating a change in zip arrangement.

2. The method of claim 1 wherein said sensible dye is sprayed onto said labels through a mask and including the step of adjusting said mask to selectively change the pattern of said sensible dye on said labels.

3. The method of claim 1 including the step of spraying an excess of said sensible dye toward said labels.

4. The method of claim 3 including the step of collecting said excess dye.

5. The method of claim 1 including the step of simultaneously spraying a plurality of said labels.

6. Apparatus for treating sheets of address labels prior to affixing said labels to envelopes, wherein said labels have indicia thereon to indicate a change from a first to a second zip code arrangement, said apparatus comprising:
   - means for sensing said change from said first to said second zip code arrangement and generating a zip change signal indicating said change in zip code arrangement;
   - spray means operative in response to said zip change signal for spraying at least the first label having said second zip code arrangement with a sensible dye;
   - means for separating said labels and thereafter applying said labels to envelopes in the same order as said labels were sensed by said sensing means; and,
   - means for subsequently sensing said sensible dye to identify envelopes having labels indicating a change in zip arrangement.

7. The apparatus of claim 6 wherein said labels are arranged on said sheets in columns and rows and wherein all labels in a row belonging to a given zip arrangement are simultaneously sprayed with said sensible dye by said spray means.

8. The apparatus of claim 6 wherein said labels are arranged on said sheets in columns and rows and including:
   - a separate spray device for each label in a given row.

9. The apparatus of claim 8 including means to selectively control said separate spray devices to select which of said labels in a given row are sprayed at any given time.

10. The apparatus of claim 6 including an adjustable mask located between said labels and said spray means to selectively control the pattern of said sensible dye that is applied to a given label.

11. The apparatus of claim 6 wherein an excess of said sensible dye is sprayed toward said labels and including means to collect said excess sensible dye.

12. The apparatus of claim 6 including control means for controlling said spray means to spray all labels having said second zip code arrangement, but to stop spraying labels at the end of said second zip code arrangement.

* * * * *